April 26, 1955 C. H. TOWNES 2,707,231

FREQUENCY STABILIZATION OF OSCILLATORS

Filed April 27, 1948

3 Sheets-Sheet 1

INVENTOR
C. H. TOWNES
BY
N. S. Ewing
ATTORNEY

INVENTOR
C. H. TOWNES
BY
N. S. Ewing
ATTORNEY

April 26, 1955 C. H. TOWNES 2,707,231

FREQUENCY STABILIZATION OF OSCILLATORS

Filed April 27, 1948 3 Sheets-Sheet 3

INVENTOR
C. H. TOWNES
BY N. S. Ewing
ATTORNEY

United States Patent Office 2,707,231

Patented Apr. 26, 1955

2,707,231

FREQUENCY STABILIZATION OF OSCILLATORS

Charles H. Townes, New York, N. Y., assignor to Bell Telephone Laboratories, Incorporated, New York, N. Y., a corporation of New York Application April 27, 1948, Serial No. 23,442

12 Claims. (Cl. 250—36)

This application is a continuation in part of United States application of C. H. Townes, Serial No. 744,236, filed April 26, 1947.

This invention relates to the generation and translation of electromagnetic energy at ultra-high frequencies.

An object of the invention is to stabilize the frequency of oscillators operating in the centimeter, millimeter and lower wavelength ranges and to provide reliable frequency standards for such ranges.

Another object of the invention is to stabilize the frequency of microwave oscillators by utilizing a lower frequency source for phase comparison of the oscillator frequency excursions.

Another object of the invention is to stabilize an ultra-high frequency oscillator on molecular or atomic absorption frequencies or on frequencies derived therefrom by the Stark effect.

A feature of the invention is a frequency stabilized oscillator, stabilized on the Stark effect frequencies produced by applying a varying electric field superimposed on a direct current field to the molecules of a gas.

Referring to the figures of the drawing.

The copending application of C. H. Townes, Serial No. 744,236, filed April 26, 1947, discloses the use of characteristic resonance absorption frequencies of molecules in wave guide transmission line circuits or the like for the generation, stabilization and translation of radio waves. Molecular absorption lines in the microwave region can be made exceedingly narrow by using very low pressure gases and since a molecular resonance frequency is relatively little disturbed by pressure, temperature, etc., it can provide good microwave frequency standards.

In accordance with an embodiment of the present invention, a microwave oscillator is frequency stabilized by modulating the molecular absorption frequencies of a gas or vapor derived from a Stark effect field at an audio frequency rate and phase detecting the resulting modulation of microwave power from the oscillator to derive therefrom a stabilizing voltage for application to the oscillator. An alternative form of stabilizer circuit utilizes a high Q resonant cavity connected to a wave guide, a frequency modulated oscillator for propagating modulated waves into the guide and a similar phase detector for providing the stabilizing voltage as heretofore.

Figure 1:
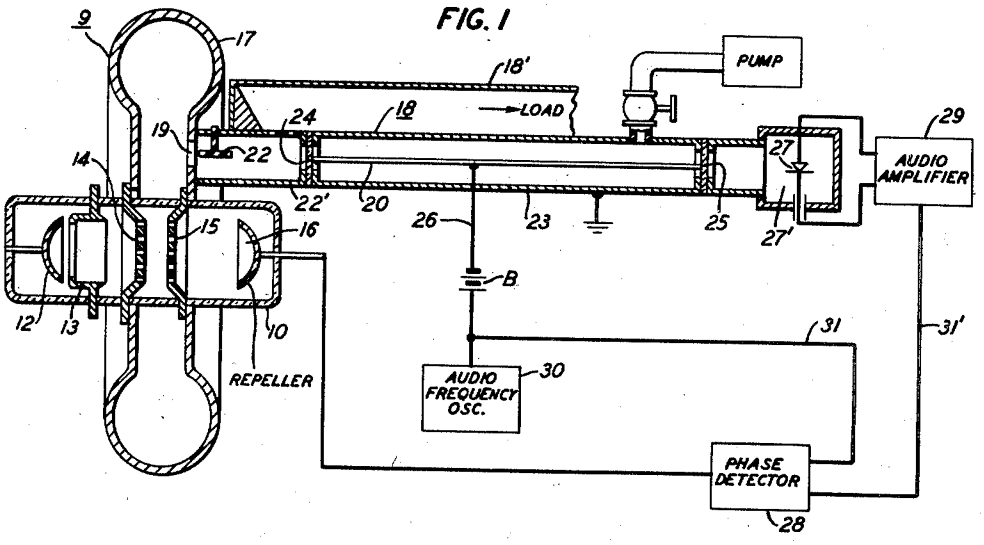
Fig. 1 shows a frequency stabilized oscillator in accordance with the invention.

Referring to Fig. 1 of the drawing, an electronic oscillator 9 of the type designated as a reflex, velocity-modulation tube, is shown comprising an evacuated envelope 10 containing a cathode 12, a collimator 13, a pair of high potential screens 14, 15 and a repeller electrode 16. Such tubes are described in an article entitled "Reflex oscillators" by J. R. Pierce and W. G. Shepherd, Bell System Technical Journal, July 1947, pages 460–681.

Figure 2:
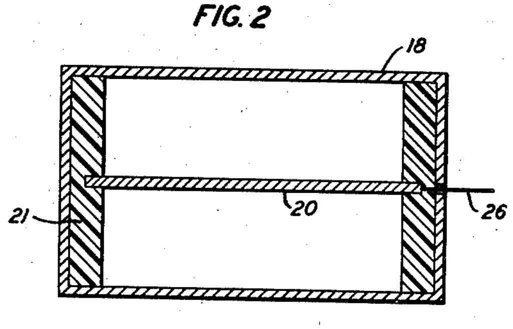
Fig. 2 shows the wave guide cross-section.

The oscillations produced by reflex oscillator tube 9 develop high intensity electromagnetic fields within the cavity resonator 17, wherefrom waves are propagated through orifice 19 into the main wave guide 18' for utilization in a useful load. A vane type attenuator 22, which may be adjusted in guide section 22', serves to control the amplitude of the waves. The guide section 22' is connected to the main guide by a directional coupler of the type disclosed in an article entitled "Directional couplers" published in the Proceedings of the I. R. E., vol. 35, pages 160–165 February 1947, by W. M. Mumford, For frequency stabilization, the oscillations from oscillator 9 pass through a window 24, transparent to electromagnetic waves, and into an absorption cell 23 which comprises a hollow rectangular wave guide 18 having a metallic strip 20 centrally located therein, parallel to the broad sides of the guide. The strip 20 may be insulated from the walls of the guide by polystyrene plates 21 as shown in Fig. 2.

The absorption cell 23 contains gas, preferably at a low pressure, and is hermetically sealed by dielectric windows 24, 25 of conventional construction, which permit the passage of electro magnetic energy and confine the gas. The details of cell construction, nature of gas and gas pressure varying means are as disclosed in the aforementioned copending application of C. H. Townes. The gas chosen is one whose inner molecular structure provides absorption resonances at some frequency or frequencies within the range of interest. At such characteristic molecular frequencies, electromagnetic energy propagated into the cell is partially absorbed while at other frequencies it is more or less freely transmitted.

The application of a direct current field to the gas by connecting a battery (B) or the like between guide 18 and metal strip 20 causes the molecular resonance absorption frequencies to be replaced by a pattern of related frequencies of lower and higher frequency in the frequency scale, known as the Stark effect frequencies or lines. The arrangement of the pattern is analogous to a corresponding phenomenon in optical spectroscopy and is in general dependent on the orientation of the applied direct current field E (i. e., whether such field is parallel to the microwave electric field vector or perpendicular thereto) and to the intensity of the said field E, etc.

For the frequency stabilization of microwave oscillators it is desirable to select a particular Stark effect absorption frequency and preferably the one having the highest intensity as the reference frequency.

If the frequency of the reflex oscallator 9 is greater or less than that of the stabilizing Stark effect frequency, there will develop in associated audio frequency circuits, described below, a voltage which will vary in polarity (i. e., positive or negative) corresponding to the direction of the frequency excursions from the stabilizing frequency.

This stabilizing voltage is derived by first super-imposing upon the applied direct current voltage aforementioned an alternating voltage $\epsilon \cos \nu_0 t$ derived from a lower frequency oscillator 30, for example, audio or radio frequency. The superposed alternating current field has the effect of shifting the Stark effect pattern back and forth in frequency in synchronism with the applied alternating current component of the field.

The Stark effect frequencies and patterns are unaffected by structure variables associated with the wave guide tubing and associated circuit elements such as normally give rise to impedance mismatches, discontinuities, etc. In addition, since properties of the wave guide and associated circuits do not produce any modulation of the microwave power at the frequency of audio modulation of the Stark field, modulation of the microwave power at this frequency is due solely to the molecular absorption line. The molecular absorption lines are determined intrinsically by the molecular structure and the applied external field. Accordingly, the microwave energy is modulated by the variable absorption of the gas produced by the alternating Stark effect field.

The modulated microwave energy is detected by detector crystal 27, which may be silicon, or germanium, or the like, and which is located in the wave guide section 27' beyond window 25.

When the oscillator 9 is stabilized on a Stark line, the absorption in the gas cell is at its peak and the current corresponding to the modulating frequency will be substantially zero in the crystal output. As the oscillator frequency drifts past the stabilization point, there will appear in the crystal output an audio component which will characterize the drift. In lieu of detection by crystals per se, heterodyne detection with a beating oscillator applied beyond the cell 23 may be used to obtain very narrow absorption lines and hence best stabilization. The heightened sensitivity in heterodyne detection results from the application of low microwave power to the molecules of the cell, which show saturation effects under high power.

The resulting audio currents are amplified in amplifier 29 and applied to a phase detector 28 for relative phase comparison with the audio oscillator currents of frequency $\nu_0$ as a reference.

If the frequency of the transmitted microwave is less than the stabilizing Stark effect frequency, then the received power or the deteceted signal will vary in phase with the impressed audio field $\epsilon_0 \cos \nu_0 t$. If the microwave is of higher frequency than the Stark line then the detected signal will be of opposite phase. If the two frequencies coincide the detected signal will have no component of frequency $\nu_0$, but only frequencies which are integral multiples of $2\nu_0$.

Figure 3:
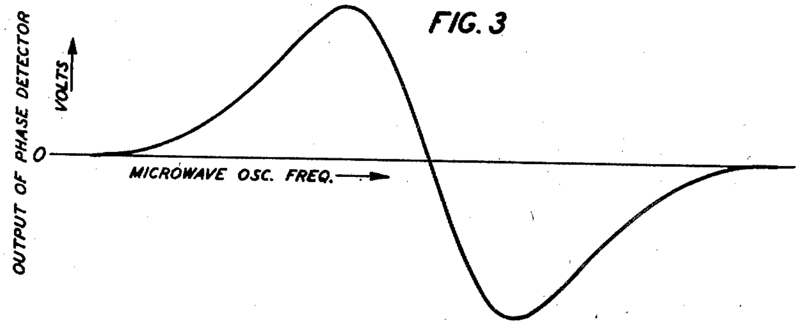
Fig. 3 is an explanatory curve.

The resulting output from the phase detector 28 as related to the frequency excursions of the oscillator about the Stark effect frequency, is represented by the discriminator curve of Fig. 3 which represents a plot of the output of the phase detector versus microwave oscillator frequencies. A positive voltage appears at the output of the phase detector when the microwave oscillator is below the Stark effect frequency, and correspondingly, a negative voltage appears at the output when the microwave oscillator is above. The polarity of the stabilizing voltage in general should conform to the type of oscillator used.

Accordingly, as the oscillator frequency fluctuates above and below the stabilizing frequency, a corresponding positive or negative voltage is fed back to the anode of oscillator tube 9 to thereby pull the oscillator frequency toward the Stark effect absorption line and thereby stabilize on this frequency.

Various gases may be used in the cell 23, each gas having a characteristic series of molecular absorption lines and corresponding Stark effect patterns. For illustrative purposes, heavy ammonia gas $N^{15}H_3$ at low pressures may be used for oscillators in the one centimeter wavelength range wherein it displays sharp absorption lines at certain characteristic frequencies, the strongest being at 22,789.41 megacycles. It is found that a direct current field of 200 volts per centimeter applied to the ammonia cell splits the aforementioned ammonia line into a pattern of four distinct Stark lines. The strongest Stark line occurs at 22,790.41 megacycles, i. e., displaced approximately one megacycle and it possesses an intensity which is about one-half that of the intensity of the original ammonia line. As is well known the frequency of the Stark effect line is dependent on the applied field E and for the ammonia line this dependence is expressed by $$\nu = 22{,}789.41 + 2.5 \times 10^{-5} E^2 \qquad (1)$$

The effect of a superimposed alternating current field $\epsilon \cos \nu_0 t$ in sweeping the frequency at which microwave absorption occurs may be expressed quantitatively as $$\nu' = 22{,}789.41 + 2.5 \times 10^{-5} E^2 + 5 \times 10^{-5} \epsilon E \cos \nu_0 t \quad (2)$$

For particular values of $$E = 200 \ \frac{\text{volts}}{\text{centimeters}}$$

$$\epsilon = 10 \ \frac{\text{volts}}{\text{centimeters}}$$

$$\nu' = 22{,}790.41 + .1 \cos \nu_0 t \text{ megacycles}$$

A system as shown in Fig. 1 for stabilizing an oscillator, on the ammonia line, has been found to operate satisfactorily and prevent frequency variation of the oscillator greater than 0.05 megacycle over a period of several hours. Stabilization of an oscillator frequency to one part in $10^6$ or $10^7$ or better may be achieved by this system.

While the principal ammonia line has been considered as an example and is one of the most favorable lines for stabilization because of its intensity, there are about fifty known ammonia lines, i. e., characteristic molecular absorption frequencies, which could be used for stabilization. Other gases and vaporized substance likewise provide numerous lines adapted for oscillator stabilization in the manner described heretofore.

Figure 4:
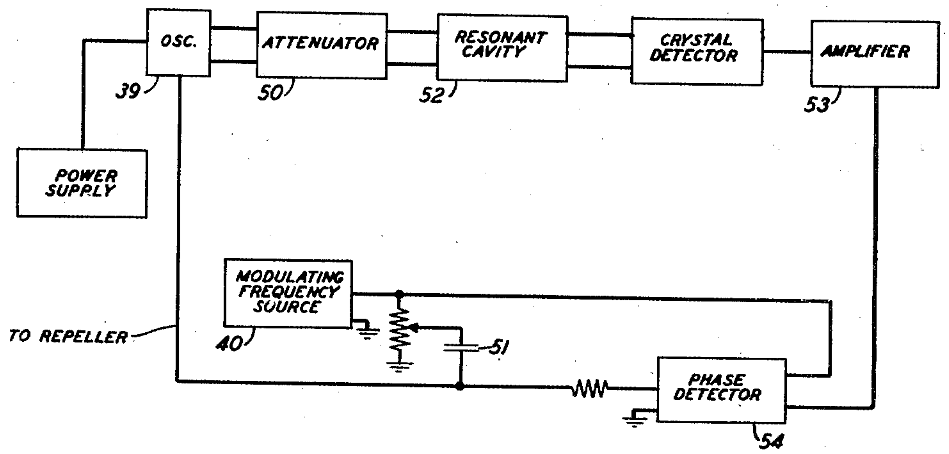
Fig. 4 is a modification of the stabilized oscillator circuit.

A modified form of frequency stabilized oscillator is shown in Fig. 4 wherein the oscillator is swept over a frequency range and a resonant cavity determines the stabilizing frequency. In this arrangement the stabilizing voltage is derived at a lower frequency from a phase detector or the like as in Fig. 1.

In Fig. 4 the microwave oscillator tube 39 is frequency-modulated over a range by an oscillator or source of lower frequency 40 connected thereto by capacitor 51. The attenuator 50 controls the level of the microwave energy applied to a resonant cavity 52, which is preferably of high Q to thereby provide a sharp reference frequency on which the oscillator frequency may be stabilized. The cavity 52 absorbs a fixed frequency determined by its geometry and dimensions. As the frequency of the oscillator 39 in its sweep attains a value less than that of the cavity the receiver power coming from the crystal detector will vary in phase with the impressed field $\epsilon \cos \nu_0 t$ where $\nu_0$ is the modulating frequency of source 40. If the oscillator frequency is higher than the cavity resonance frequency the received power will be of opposite phase as shown by the curve of Fig. 3.

The audio amplifier 53 and phase detector 54 are similar to those shown in Fig. 1. Likewise, the output of the phase detector 54 is fed back as a positive or negative voltage to the repeller electrode of oscillator 39 for stabilization. Its effect is to pull the frequency of the oscillator toward the cavity frequency and stabilize it thereon.

The resonant cavity 52 may be of any suitable type, for example, the type used in microwave wave meters operating in a single mode, as disclosed in the aforementioned Townes application. The resonant cavity may be connected as a side branch of the main guide or be interposed in the guide for through transmission of waves.

Figure 5:
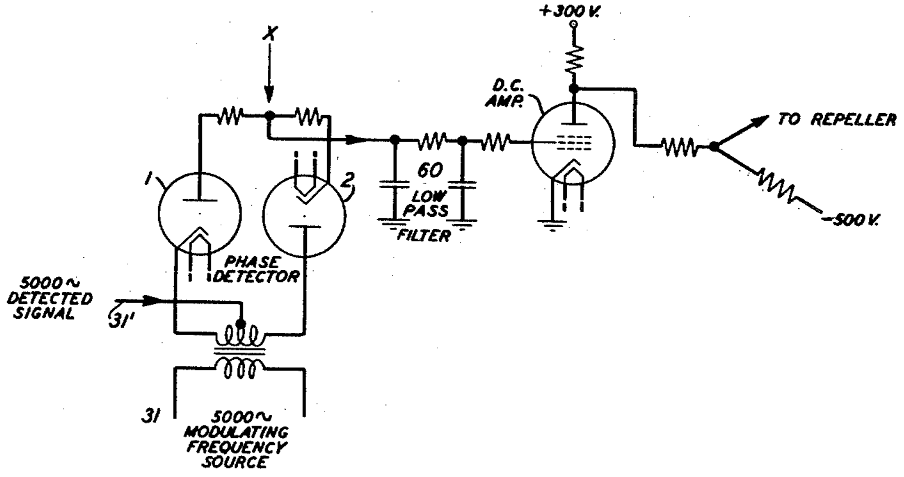
Fig. 5 shows a phase detector circuit.

Various phase discriminator detector circuits may be used. One typical and specific circuit found effective is shown in Fig. 5. It is essentially a balanced bridge modulator using diodes 1, 2 for modulation. The two inputs 31, 31' therefor are voltage sources of the same audio frequency, for example, 5000 cycles but having a relative phase difference. The output voltage is taken off at X and is related to the phase difference, being of one polarity when the phase difference is zero and the opposite polarity when the phase difference is 180 degrees. The output from X is passed through a low-pass network 60, amplified in a direct current amplifier and applied to the repeller electrode. Other forms of phase difference detector circuits may be found useful, for example, the type illustrated by United States Patent 2,093,512, issued September 21, 1937, to A. E. Bowen, United States Patent 1,695,047, issued December 11, 1927, to J. W. Horton, and United States Patent 1,450,966, issued April 10, 1923, to H. A. Affel.

Whereas the gas cell heretofore disclosed is of sufficient length to produce an appreciable absorption of microwaves propagated therethrough in a single passage, the use of much shorter lengths of guide is contemplated in accordance with the spirit of the invention. Shorter lengths are feasible where the microwaves can be reflected back and forth to provide multiple passages through the gas as in a resonance chamber type of gas cell, resonant to a molecular absorption frequency or to a derived Stark effect frequency.

Although Stark effect frequencies have heretofore been disclosed, Zeeman effect frequencies produced by applied magnetic fields may similarly be used for oscillator frequency stabilization.

Should the stabilizing circuit of Fig. 1 not respond properly in times less than $10^{-4}$ seconds, it may be found desirable to supplement it with a stabilizing circuit using resonant cavities, for example, of the type disclosed in the United States application of A. C. Beck and D. H. Ring, Serial No. 670,384, filed May 17, 1946, which issued as United States Patent 2,691,724, October 12, 1954. In such a modified system, best stabilization may be obtained by narrowing the oscillator spectrum with a resonant cavity to about 100 cycles, and then obtaining long-time stability by utilizing the molecular absorption line as heretofore described.

Figure 6:
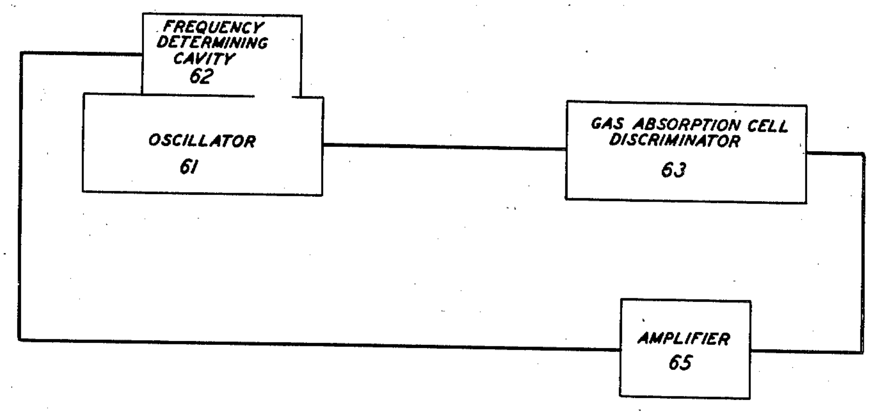
Figs. 6 and 7 are modifications of the frequency stabilization circuit of Fig 1.

Fig. 6 shows a circuit for frequency stabilizing a microwave oscillator by a resonant cavity supplemented by the more sensitive stabilization provided by the molecular absorption line technique aforementioned in the disclosure of Fig. 1.

The oscillator 61, which may be of the reflex-klystron type heretofore disclosed, is provided with a resonant cavity 62 for frequency stabilization in the manner disclosed in the Beck-Ring application aforementioned. Such a circuit per se gives good frequency stabilization except for drifts due to the effects of time, temperature and humidity on the resonant cavity. Long-time stability and increased sensitivity are obtained by connecting the resonant cavity 62 and oscillator 61 to a wave guide gas absorption cell discriminator 63, comprising the components of the Stark effect circuit shown in Fig. 1 disclosed heretofore. Control stabilizing potentials for the oscillator 61 are derived from the Stark effect gas cell discriminator, amplified and applied to the frequency controlling elements of the oscillator as previously disclosed.

Figure 7:
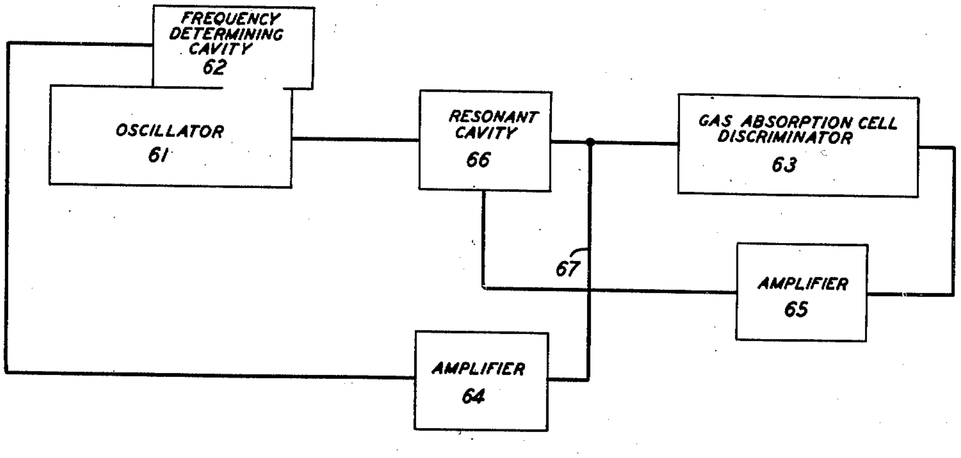

Fig. 7 shows a further refinement of the stabilized oscillator disclosed in Fig. 6. In this instance, a supplemental precision built cavity 66 provided with controls (not shown) for maintaining a constant temperature and humidity environment thereabout, is utilized to improve the stability over that obtainable by cavity 62 alone. The resonant frequencies of cavities 62 and 66 should be substantially alike. As shown in Fig. 7, a control potential for stabilization is fed from cavity 66, along conductor 67, through amplifier 64 to the oscillator 61. Long-time frequency stability is achieved by connecting the Stark effect gas absorption cell discriminator 63 and feeding the control potentials through an amplifier 65 into cavity 66.

What is claimed is:

1. The method of stabilizing the frequency of an oscillator, which consists in applying the electromagnetic waves therefrom to a gas that absorbs said waves at characteristic molecular absorption frequencies, applying a constant electric field to said gas to provide the Stark lines thereof, and modulating a particular Stark effect frequency for stabilization.

2. The method of stabilizing the operating frequency of an electronic oscillator, comprising propagating said oscillations in a gas, modulating the molecular resonance absorption characteristics of said gas at a lower frequency, and detecting said modulations to derive a voltage for controlling and stabilizing the frequency of said oscillator.

3. The method of employing the resonant absorption characteristic of a microwave absorptive gas for stabilizing the frequency of a microwave generator which comprises exciting the gas by the generated oscillations, applying an alternating field of lower frequency to said gas to modulate the microwave energy, and demodulating said energy to provide a frequency control voltage for said oscillator.

4. In combination, a microwave oscillator including means responsive to an applied voltage for controlling the frequency of its output, a gas cell containing a microwave absorptive gas and supplied with waves from said oscillator, a source of oscillations connected to apply a fluctuating field to said gas to modulate the absorption frequencies thereof, a rectifier supplied with waves from said gas cell, means for comparing the phase of the output of said rectifier with the phase of oscillations from said source to derive a stabilizing voltage, and means for applying said stabilizing voltage to said oscillator to regulate its frequency.

5. A combination according to claim 4 in which the frequency of the output of said source of oscillations is low compared to the frequency of the output of said microwave oscillator.

6. A combination according to claim 4 in which the fluctuating field applied to the gas is an electrostatic field.

7. In combination, a microwave oscillator, a gas cell containing a rarefied gas that exhibits distinct molecular resonance absorption lines, means for applying a field to said gas to modulate at least one of said absorption lines, means for applying waves from said oscillator to said gas, and means for utilizing said waves after transmission through said gas for regulating the frequency of said oscillator.

8. In combination, a microwave oscillator, a gas cell containing a rarefied gas that exhibits distinct molecular resonance absorption lines, means for applying a steady field to said gas to split an absorption line, means for superimposing on said steady field a varying field to correspondingly vary the position in the frequency spectrum of at least one of said split lines, means for supplying waves from said oscillator to said gas, and means responsive to said waves after transmission through said gas for regulating the frequency of said oscillator.

9. In combination, a microwave oscillator, a gas cell containing a rarefied gas that exhibits distinct molecular resonance absorption lines, means for applying a steady electric field to said gas to split at least one of said absorption lines, means for superimposing on said steady electric field a varying field to correspondingly vary the position in the frequency spectrum of at least one of said split lines, means for supplying waves from said oscillator to said gas, and means responsive to said waves after transmission through said gas for regulating the frequency of said oscillator.

10. In an automatic frequency control system, a microwave source, a gas cell containing a microwave absorptive gas, an oscillator, means responsive to oscillations from said oscillator for subjecting said gas to a cyclically varying field to produce corresponding variations in the frequency spectrum of the microwave absorptive characteristic of said gas, means for transmitting microwaves from said source through said gas, means for detecting the microwave output of said gas to produce signals of phase significant of the departure of the frequency of the microwave from said source from the mean frequency of an obsorption line of said gas, means for comparing said signals and said oscillations in phase to produce a direct-current voltage of polarity and amplitude proportional to their relative phase, and means responsive to said direct-current voltage for regulating the frequency of the microwaves produced by said source.

11. A system according to claim 10 including means for producing in said gas a constant field of substantial value upon which there is superimposed a field proportional to the amplitude of the oscillations from said oscillator.

12. In a frequency stabilizing system, an oscillator having associated therewith an electromagnetic resonator for short-term stabilization, a gas cell containing a rarefied gas exhibiting distinct molecular resonance absorption lines, means for applying a field to said gas to produce variations in the frequency spectrum of said molecular resonant absorption lines, means for applying waves from said oscillator to said gas, and means responsive to said waves after transmission through said gas for regulating the frequency of said oscillator to produce long-term frequency stabilization thereof.

References Cited in the file of this patent

UNITED STATES PATENTS

| | | |
|---|---|---|
| 2,404,568 | Dow | July 23, 1946 |
| 2,457,673 | Hershberger | Dec. 28, 1948 |
| 2,462,294 | Thompson | Feb. 22, 1949 |
| 2,475,074 | Bradley | July 5, 1949 |
| 2,624,840 | Hershberger | Jan. 6, 1953 |
| 2,640,156 | Schultz | May 26, 1953 |